United States Patent
Koval

(10) Patent No.: US 12,521,885 B2
(45) Date of Patent: Jan. 13, 2026

(54) ROBOTIC WALLBOARD DUNNAGE PLACEMENT SYSTEM

(71) Applicant: KNAUF GIPS KG, Iphofen (DE)

(72) Inventor: Ronald Koval, Aurora, IL (US)

(73) Assignee: KNAUF GIPS KG, Iphofen (DE)

( * ) Notice: Subject to any disclaimer, the term of this patent is extended or adjusted under 35 U.S.C. 154(b) by 138 days.

(21) Appl. No.: 18/606,420

(22) Filed: Mar. 15, 2024

(65) Prior Publication Data

US 2025/0100148 A1    Mar. 27, 2025

Related U.S. Application Data

(60) Provisional application No. 63/584,384, filed on Sep. 21, 2023.

(51) Int. Cl.
    *B25J 15/00*    (2006.01)
    *B25J 9/16*    (2006.01)
    (Continued)

(52) U.S. Cl.
    CPC ......... *B25J 9/1687* (2013.01); *B25J 15/0066* (2013.01); *B65B 35/38* (2013.01);
    (Continued)

(58) Field of Classification Search
    CPC .. B25J 9/1687; B25J 15/0066; B25J 15/0616; B25J 15/008; B65B 35/38; B65B 35/50;
    (Continued)

(56) References Cited

U.S. PATENT DOCUMENTS

| | | | | |
|---|---|---|---|---|
| 1,196,094 A | * | 8/1916 | Fischer | B65B 5/024 |
| | | | | 53/208 |
| 1,327,665 A | * | 1/1920 | Dun | B42C 19/02 |
| | | | | 156/352 |

(Continued)

FOREIGN PATENT DOCUMENTS

| | | | | |
|---|---|---|---|---|
| CA | 2228093 A1 | * | 12/1998 | |
| CA | 3220670 A1 | * | 12/2022 | B65B 11/02 |

(Continued)

OTHER PUBLICATIONS

"Development of Robot Cell with SCARA Robot for Handling Motor Stators;" Babic et al., 2024 11th International Conference on Electrical, Electronic and Computing Engineering (IcETRAN) (2024, pp. 1-6); Jun. 3, 2024. (Year: 2024).*

(Continued)

*Primary Examiner* — Bao Long T Nguyen
*Assistant Examiner* — Jorge O Peche
(74) *Attorney, Agent, or Firm* — Greer, Burns & Crain, Ltd; Pradip Sahu; Philip T. Petti

(57) ABSTRACT

A system is provided for robotically placing dunnage strips for receiving wallboard panels, including providing a robot with a robot arm with a tool having at least one suction cup and a glue dispenser; presetting in the robot a plurality of dunnage location programs, each associated with a particular wallboard panel size or thickness; and providing a dunnage cube with a plurality of stacked dunnage strips. Upon the selection of a preset wallboard panel dunnage location, the robot arm uses the suction cup to select and lift a strip from dunnage cube. Then, the robot arm places the strip upon the warehouse floor in a predesignated location per the preset program, and the glue dispenser on the robot deposits glue upon the strip. The robot repeats the dunnage strip selection, lifting, placement and deposition of glue to (Continued)

multiple dunnage strips until the preset arrangement is completed per the program.

14 Claims, 3 Drawing Sheets

(51) Int. Cl.
  *B65B 35/38* (2006.01)
  *B65B 35/50* (2006.01)
  *B65B 55/00* (2006.01)
  *B65G 57/04* (2006.01)
  *B25J 15/06* (2006.01)

(52) U.S. Cl.
  CPC .............. *B65B 35/50* (2013.01); *B65B 55/00* (2013.01); *B65G 57/04* (2013.01); *B25J 15/0616* (2013.01)

(58) Field of Classification Search
  CPC .... B65B 55/00; B65G 57/04; B65D 71/0092; B65D 85/46
  See application file for complete search history.

(56) References Cited

U.S. PATENT DOCUMENTS

| | | | | |
|---|---|---|---|---|
| 1,849,328 | A * | 3/1932 | Ingwersen | B65B 57/14 156/352 |
| 1,946,056 | A * | 2/1934 | Birdsey | B65B 17/00 156/464 |
| 1,980,982 | A * | 11/1934 | Crawford | E04C 1/39 52/351 |
| 2,040,872 | A * | 5/1936 | Oberhoffken | B23B 39/162 74/568 R |
| 2,208,856 | A * | 7/1940 | Rosenleaf | B65B 17/00 493/379 |
| 2,813,638 | A * | 11/1957 | Miller, Jr. | B65G 57/245 198/374 |
| 2,833,403 | A * | 5/1958 | Benschoter | B65D 71/0092 206/83.5 |
| 3,117,902 | A * | 1/1964 | Holzhelmer | F16L 59/22 156/247 |
| 3,126,843 | A * | 3/1964 | De Laney | B65D 19/18 108/52.1 |
| 3,133,850 | A * | 5/1964 | Alenius | B27D 3/04 156/562 |
| 3,248,037 | A * | 4/1966 | Simkins | B65D 19/20 141/331 |
| 3,251,322 | A * | 5/1966 | Downs | B65D 19/002 108/57.33 |
| 3,438,830 | A * | 4/1969 | Harmsworth | B27D 1/04 156/578 |
| 3,461,932 | A * | 8/1969 | Shelton | B27D 1/10 156/159 |
| 3,507,438 | A * | 4/1970 | Mullin | B27F 4/00 227/14 |
| 3,654,039 | A * | 4/1972 | Bucher | B32B 17/10908 118/118 |
| 3,661,681 | A * | 5/1972 | Edelberg | A43D 29/00 156/557 |
| 3,699,902 | A * | 10/1972 | Allgeyer | B65D 19/0012 108/57.26 |
| 3,721,368 | A * | 3/1973 | Arneson | B65D 71/0022 229/936 |
| 3,733,982 | A * | 5/1973 | Manolis | B31B 70/8136 493/212 |
| 3,928,119 | A * | 12/1975 | Sarring | B42C 9/0062 412/37 |
| 3,966,529 | A * | 6/1976 | Kuroda | B65D 19/0095 108/57.17 |
| 4,012,276 | A * | 3/1977 | Schertler | B31F 1/2813 156/558 |
| 4,121,505 | A * | 10/1978 | Tanaka | A01G 24/60 493/951 |
| 4,142,471 | A * | 3/1979 | Mustoe | B65D 71/0092 108/57.1 |
| 4,313,775 | A * | 2/1982 | Moore | B44F 11/06 156/196 |
| 4,471,601 | A * | 9/1984 | Strombeck | B65B 7/20 141/172 |
| 4,486,264 | A * | 12/1984 | McKernan | B27M 3/0073 156/197 |
| 4,790,249 | A * | 12/1988 | Webb | B65D 19/0012 428/116 |
| 4,867,819 | A * | 9/1989 | Richardelli | B27M 3/34 156/364 |
| 4,897,980 | A * | 2/1990 | Geyser | B65B 5/028 53/139.5 |
| 5,044,067 | A * | 9/1991 | Wheadon | H01M 4/84 29/730 |
| 5,066,440 | A * | 11/1991 | Kennedy | E04B 2/24 264/246 |
| 5,125,885 | A * | 6/1992 | Wooley | B31B 70/00 493/264 |
| 5,141,109 | A * | 8/1992 | Bergeron, Sr. | B65D 71/0096 206/599 |
| 5,160,563 | A * | 11/1992 | Kutchmarek | E06B 9/266 428/116 |
| 5,692,790 | A * | 12/1997 | Panyard | B25J 17/0208 901/45 |
| 5,984,623 | A * | 11/1999 | Smith | B65G 61/00 414/737 |
| 6,106,655 | A * | 8/2000 | Moser | B27M 3/0086 156/87 |
| 6,163,946 | A * | 12/2000 | Pryor | B25J 9/1697 29/702 |
| 6,167,607 | B1 * | 1/2001 | Pryor | B25J 19/021 29/702 |
| 6,514,585 | B1 * | 2/2003 | Pearson | G09F 3/10 221/56 |
| 6,658,816 | B1 * | 12/2003 | Parker | B65G 57/005 414/788.1 |
| 6,994,241 | B1 * | 2/2006 | Ohnesorge | B65G 47/2445 227/100 |
| 7,874,067 | B1 * | 1/2011 | Hiew | G06F 1/1632 29/841 |
| 8,240,034 | B1 * | 8/2012 | Hiew | H05K 3/0052 29/841 |
| 8,701,365 | B2 | 4/2014 | Rosenthal et al. | |
| 8,892,244 | B1 * | 11/2014 | Taylor | F41H 5/0492 700/218 |
| 8,944,481 | B2 * | 2/2015 | Collado Jimenez | B25J 9/023 294/185 |
| 9,682,483 | B1 * | 6/2017 | Romano | B25J 11/0085 |
| 9,927,815 | B2 * | 3/2018 | Nusser | B65G 57/03 |
| 10,086,514 | B2 * | 10/2018 | Fair | B25J 9/1687 |
| 10,562,817 | B2 | 2/2020 | Voigt et al. | |
| 10,943,210 | B2 | 3/2021 | Hance et al. | |
| 11,123,944 | B1 * | 9/2021 | Hoffman | B65B 53/063 |
| 11,200,663 | B1 * | 12/2021 | Bolton | G06T 7/001 |
| 11,767,168 | B2 | 9/2023 | Eckman et al. | |
| 11,780,197 | B2 * | 10/2023 | Johnson | B31B 50/046 493/132 |
| 12,377,551 | B1 * | 8/2025 | O'Quinn | B65G 60/00 |
| 2002/0084037 | A1 * | 7/2002 | Gorich | B27G 11/00 156/364 |
| 2003/0185654 | A1 * | 10/2003 | Rathert | B42C 11/045 412/37 |
| 2005/0079965 | A1 * | 4/2005 | Moshier | B65D 5/02 493/52 |
| 2007/0130855 | A1 | 6/2007 | Wentworth | |
| 2008/0000580 | A1 * | 1/2008 | Marchke | B31F 1/2813 156/271 |
| 2008/0067225 | A1 * | 3/2008 | Moore | B65B 53/063 229/194 |
| 2008/0073028 | A1 * | 3/2008 | Yu | H01L 24/83 156/289 |

(56) References Cited

U.S. PATENT DOCUMENTS

| | | | | |
|---|---|---|---|---|
| 2008/0078495 A1* | 4/2008 | Marschke | ............. | B31D 3/007 156/472 |
| 2008/0087383 A1* | 4/2008 | Biktjorn | ................. | E04F 21/06 156/556 |
| 2008/0142407 A1* | 6/2008 | Moore | ................. | B65B 53/063 206/583 |
| 2008/0236730 A1* | 10/2008 | Marschke | ............... | B31F 1/305 156/472 |
| 2009/0085251 A1* | 4/2009 | Brown | ................... | B28B 1/002 264/294 |
| 2010/0075095 A1* | 3/2010 | Johnson | ............... | E04F 15/048 428/53 |
| 2010/0119857 A1* | 5/2010 | Johnson | ................... | B27N 3/04 428/537.1 |
| 2010/0158637 A1* | 6/2010 | Manico | ................. | B42D 3/002 412/8 |
| 2012/0114850 A1* | 5/2012 | Ferguson | ................. | E04B 2/54 118/100 |
| 2012/0170996 A1* | 7/2012 | Speller | ................. | B42C 9/0006 412/37 |
| 2012/0251270 A1* | 10/2012 | Speller | ............... | B65H 29/6627 412/37 |
| 2013/0084146 A1* | 4/2013 | Speller | ................. | B42C 9/0006 412/37 |
| 2015/0059286 A1* | 3/2015 | Vazul | ..................... | B65B 61/28 53/244 |
| 2015/0122176 A1* | 5/2015 | Ma | ......................... | B25J 19/023 118/712 |
| 2016/0319959 A1* | 11/2016 | Pratt | .................. | B65D 19/0002 |
| 2019/0119045 A1* | 4/2019 | Vazul | .................... | B65G 17/34 |
| 2019/0240943 A1* | 8/2019 | Orsini | .................. | B65D 5/5028 |
| 2021/0094192 A1* | 4/2021 | Maurer | ................ | B25J 17/0241 |
| 2022/0002997 A1* | 1/2022 | Schiffmann | ............... | B32B 5/18 |
| 2022/0227022 A1* | 7/2022 | Nielsen | .................... | B05D 1/02 |
| 2023/0029060 A1* | 1/2023 | Sarikas | .................. | B65G 61/00 |
| 2024/0239556 A1* | 7/2024 | Ritondo | ................ | B31B 70/266 |
| 2024/0400244 A1* | 12/2024 | Slavinski | ............... | B65B 35/18 |
| 2025/0100148 A1* | 3/2025 | Koval | ..................... | B65B 55/00 |

FOREIGN PATENT DOCUMENTS

| | | | | |
|---|---|---|---|---|
| CN | 1617817 A | * | 5/2005 | ........... B65B 11/025 |
| CN | 1701859 A | * | 11/2005 | |
| CN | 101082742 A | * | 12/2007 | |
| CN | 106553909 A | * | 4/2017 | ............. B65G 57/20 |
| CN | 113199575 A | * | 8/2021 | ............... B27D 1/08 |
| CN | 213886959 U | * | 8/2021 | |
| CN | 214675935 U | * | 11/2021 | |
| CN | 115504258 A | | 12/2022 | |
| DE | 20302426 U1 | * | 7/2004 | ............. B65D 85/46 |
| EP | 0437418 B1 | * | 11/1992 | ........... E06B 3/6733 |
| EP | 0616874 B1 | * | 9/1997 | ........... B25J 15/0616 |
| EP | 3725713 A1 | * | 10/2020 | ......... B25J 15/0014 |
| EP | 3636395 B1 | * | 10/2023 | ......... B25J 15/0408 |
| ES | 1138410 U | * | 4/2015 | ............. B65D 85/62 |
| FR | 2490536 A1 | * | 3/1982 | ............. B27D 1/083 |
| FR | 2822815 A1 | * | 10/2002 | ......... B29C 66/8242 |
| FR | 3 033 774 A3 | | 9/2016 | |
| GB | 2366376 A | * | 3/2002 | ............... G01N 1/31 |
| JP | H01255501 A | * | 10/1989 | |
| JP | 11113550 A | * | 4/1999 | |
| JP | 11113551 A | * | 4/1999 | |
| JP | 3063487 B2 | * | 7/2000 | ............. B65G 61/00 |
| JP | 2001334484 A | * | 12/2001 | |
| JP | 3333436 B2 | * | 10/2002 | |
| JP | 3333437 B2 | * | 10/2002 | |
| JP | 2005129668 A | * | 5/2005 | ............. H05K 3/305 |
| TW | I664132 B | * | 7/2019 | ............. B25J 9/106 |
| WO | WO-0216223 A1 | * | 2/2002 | ......... B65D 71/0088 |
| WO | WO-2016075424 A1 | * | 5/2016 | ......... B25J 15/0616 |
| WO | WO-2024086889 A1 | * | 5/2024 | ........... B05C 5/0208 |

OTHER PUBLICATIONS

"Increased reliability by effective use of sensor information: a shop floor application of sensor-aided robotic handling;" Friedrich et al., Proceedings 1995 Second New Zealand International Two-Stream Conference on Artificial Neural Networks and Expert Systems (1995, pp. 359-364); Jan. 1, 1995. (Year: 1995).*

"A Step Towards a Flexible Manufacturing System Warehouse: Robotization of a Stacker Crane;" Bosinovski et al., 2025 60th International Scientific Conference on Information, Communication and Energy Systems and Technologies (ICEST) (2025, pp. 1-4); Jun. 26, 2025. (Year: 2025).*

International Search Report and Written Opinion received for PCT/US2024/046854, mailed Jan. 24, 2025.

* cited by examiner

ROBOTIC WALLBOARD DUNNAGE PLACEMENT SYSTEM

RELATED APPLICATION

The present application is a Non-Provisional of, and claims 35 US 119 priority from, U.S. Patent application No. 63/584,384 filed Sep. 21, 2023, the entire contents of which are incorporated by reference herein.

BACKGROUND

The present invention relates generally to material handling systems in factories, and more specifically to an improved system for handling stacks of finished wallboard panels in a production warehouse for preparing the panels for bulk shipment.

In a wallboard panel production plant, wallboard panels are typically packaged in so-called bundles having two sheets or panels of wallboard. A typical dimension of the panels used in such bundles is 4 feet×8 feet, however other dimensions are contemplated, as are well known in the art. Panel lengths of up to 16 feet are common. For efficient shipping, multiple bundles of the same size sheet are stacked in a unit, which includes from thirteen to seventeen bundles or 26-34 sheets. The number of bundles in a unit can vary with the application. In the wallboard production facility or factory, the unit is assembled so that the bundles are aligned edge to edge and a plurality of dunnage strips are placed transversely across a top surface of the unit in spaced, parallel orientation. It is not uncommon for units to be stacked 12 high in a warehouse. Depending on the type of panel, units vary in weight from 2,000 to 3800 pounds. Stack weights range between 5,000-12,000 pounds.

Dunnage strips are elongate strips of wallboard that is usually damaged or defective to the extent they cannot be sold, but are still serviceable as spacers. In some cases, production runs are made for specifically generating dunnage. Each dunnage strip is made of four-to-six thicknesses of strips of wallboard fastened together by adhesive to form an elongate, beam-like unit. These dunnage strips are palletized and stacked in alternating directions per layer to form a dunnage cube. The unit is assembled at a production line end to form a sample stack of a designated number of units, then, as needed, the unit is lifted on the forks of a forklift truck, or more recently, on forks of an automated guided vehicle (AGV), which then transports the unit within a warehouse of the factory. Multiple units are vertically positioned into stacks, with the dunnage strips spacing the units vertically from each other, and defining spaces for receiving fork lift or AGV forks to allow movement of units as needed into waiting trucks or railroad cars.

In a transition from operator-driven fork lifts to move wallboard panels from production line takeoffs to the stacking in the warehouse, operators often had to manually position dunnage strips on the warehouse floor to receive the panels forming the unit. Most often the forklift operator would carry slats of floor dunnage on a rear chassis of the forklift. When delivering a wallboard load to the initial floor position, the operator would have to stop the forklift, dismount, place the dunnage strips on the floor in accordance with the size of wallboard panel in question, reseat to the forklift and place the panels upon the dunnage strips.

To reduce operator labor, many warehouses have incorporated AGV's for transporting wallboard panels from production to the warehouse. As such, the warehouses needed to be fitted with permanent floor dunnage for the AGV to properly place the panels in the warehouse. Also, to accommodate the AGV's, the warehouse was required to allot specific areas of the warehouse floor for dunnage associated with different sizes of panels, since the number and spacing of the dunnage strips varies with the size and/or thickness of the panels.

The use of fixed dunnage, usually made of rubber strips fastened to the warehouse floor, thus reduces the flexibility of warehouse operators on the use of warehouse space. In addition, the fixed dunnage is subject to damage by manually driven forklifts, especially from impact of lowered forks being manipulated in tight spaces, or from the forklift wheels cornering entry traversing the warehouse storage aisle or lane defined by the fixed dunnage. Such damage has been sufficiently serious in some cases such that a subsequent access to the damaged area by an AGV can cause the AGV wheels to be improperly deflected and possibly cause the AGV to tip over, damaging the AGV and/or wallboard being assembled into the unit. Also, permanent dunnage creates difficulties in maintaining the cleanliness and condition of the warehouse floor.

Thus, there is a need for an improved warehouse system used for assembling, storing and handling units of wallboard panels.

SUMMARY

The above-listed need is met or exceeded by the present robotic wallboard dunnage placement system which enables a robotic pick and place procedure for pre-stacked dunnage strips located in a so-called dunnage cube. Multiple prepared dunnage locations are preset or programmed into the robot and are associated with specific sizes and/or thicknesses of wallboard panels. A robot arm tool is provided with at least one and preferably two suction cups and a glue dispensing nozzle. The specific orientation of the cups and nozzle may vary to suit the application.

Once a given pre-selected wallboard panel size/thickness is selected, the robot arm is used to lift individual or potentially multiple dunnage strips from the dunnage cube, dispense a portion of glue upon an upper surface of the strip, and place the strip in position on the warehouse floor. This lifting, gluing and placement process is repeated until the dunnage strips are properly positioned upon the warehouse floor according to the program for that particular size and type of panel. Next, the wallboard panels are placed by the forklift or AGV upon the placed dunnage strips. The lowermost panel is directly adhered to the glue on the upper surface of the dunnage strips. As additional panels are assembled to form the unit, the weight of the unit activates and enhances the adhesion of the glue.

A preferred type of glue is known as gummy glue or "credit card" glue which readily fastens paper surfaces together, and is pressure sensitive, but is easily removed without staining or damaging either fastened surface. The glue does not set soon after application, but is heat or pressure activated. Thus, the weight of the panels stacked upon the dunnage strips will activate the glue. Upon completion of the assembly of the unit, either a forklift or an AGV uses its forks to transport the unit to the warehouse, where it is then placed upon an existing unit, or forms the bottom of a new stack. In the present system, the conventional preplacement of dunnage strips upon the top surface of the unit is no longer necessary.

As a result of the present system, forklift or warehouse operators are relieved of the added labor and inconvenience of manual preparation of the first layer of floor dunnage.

Also, the present system dispenses with the requirement for the placement of permanent dunnage strips, which restrict the flexibility and maintenance of the warehouse. Also, the implementation of AGV's, and the use of glue as described above, results in an open warehouse floor, without the need of floor permanent dunnage, and maintains flexible warehouse usage and maintenance.

More specifically, a system is provided for robotically placing dunnage strips for receiving wallboard panels, including providing a robot with a robot arm with a tool having at least one suction cup and a glue dispenser; presetting in the robot a plurality of dunnage location programs, each associated with a particular wallboard panel size or thickness; providing a dunnage cube having a plurality of stacked individual dunnage strips, each said strip having an upper surface. Upon the selection of a preset wallboard panel dunnage location, the robot arm uses the at least one suction cup to select and lift at least one dunnage strip from the dunnage cube. Next, the robot arm places the dunnage strip upon the warehouse floor in a predesignated location per the preset location program, and the glue dispenser deposits a supply of glue upon the upper surface of the dunnage strip. The robot repeats the dunnage strip selection, lifting, placement and deposition of glue to multiple dunnage strips until the preset dunnage strip arrangement is completed per the program.

In an embodiment, the system further includes placing at least one wallboard panel upon the upper surfaces of the dunnage strips so that a lowermost panel of the at least one panel is adhered to the strips. In a preferred embodiment, the system includes placing multiple wallboard panels upon the at least one panel adhered to the strips so that a unit of wallboard panels is formed.

In an embodiment, the present system includes using one of "gummy glue" fugitive glue, e-z release glue, "booger glue" and "credit card" glue. In another embodiment, the robot arm tool has a pair of the suction cups with a glue dispenser mounted therebetween.

In an embodiment, the preset dunnage locations in the robot program include dunnage strip spacings of at least one of 22, 24, 26, 28, 30, 32 and 36 inches. In a further embodiment, the preset spacing for 8 foot panels in the robot program is 36, 24, 26 inches. In a further embodiment, for ½ inch thick panels 9 feet in length, the preset dunnage spacing is 30, 24, 24 and 30 inches. In a further embodiment, the preset dunnage spacing for 10 foot panels is 22, 26, 24, 26 and 22 inches. In a further embodiment, the preset dunnage spacing for 12 foot panels is 24, 36, 24, 36, and 24 inches. In a further embodiment, for 14 foot panels, the preset dunnage spacing is 32, 28, 24, 24 28 and 32 inches. In a further embodiment, for 16 foot panels, the preset dunnage spacing is 24, 24, 32, 32, 32, 24 and 24 inches. Metric spacing of dunnage strips and metrically dimensioned wallboard and dunnage strips are also contemplated.

DETAILED DESCRIPTION

Figure 1:
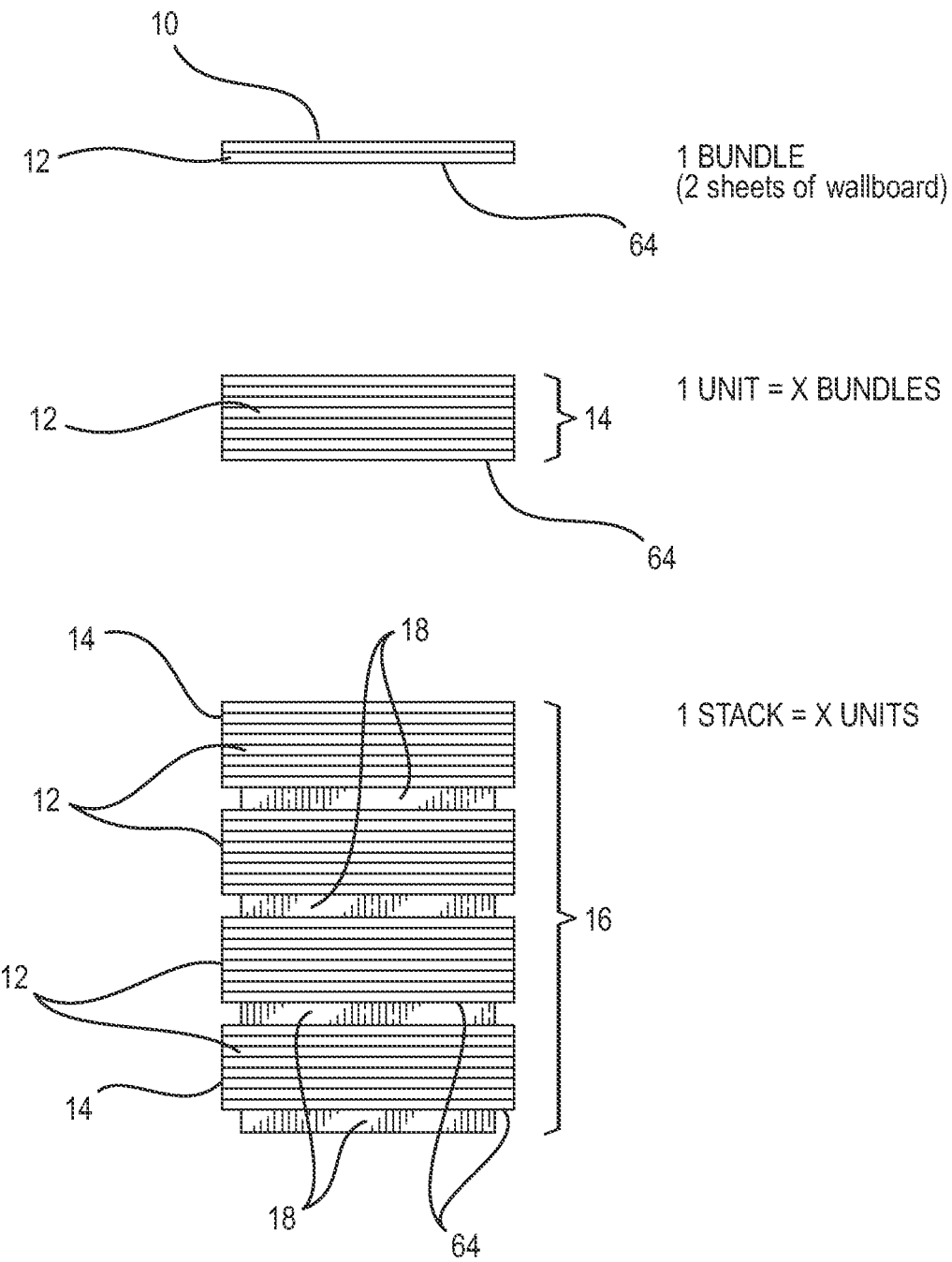
FIG. 1 is a diagram of the creation wallboard bundles, units and stacks as known in the art.

Referring now to FIG. 1, various configurations of production wallboard panels are shown, a bundle 10 refers to two wallboard panels 12. In the present application, wallboard panel applies to any one of a number of construction panels, including but not limited to paper faced gypsum wallboard panels, plywood panels, cement board panels, insulation panels and the like. A unit 14 is a compilation of bundles 10, ranging broadly from four to ten bundles. However, it is contemplated that the number of bundles 10 forming a unit 14 may vary to suit the application and the particular size and/or thickness of the wallboard panel 12. Multiple units 14 are used to form a stack 16, which is how the panels 12 are stored in a warehouse. Some warehouse stacks 16 can have up to 12 units each. Also, it is contemplated that the number of units 14 in a stack 16 can vary to suit the application and the particular size and/or thickness of the wallboard panel 12. As seen, the units 14 in the stack 16 are separated by dunnage strips 18.

Dunnage strips 18 are elongate compilations of scrap or intentionally produced, purpose-specific wallboard, usually held together with strong adhesive to form a beam-like configuration. A preferred dunnage strip 18 has four-six thicknesses of wallboard, however the number of thicknesses in a strip 18 may vary to suit the application and depend on the type and/or thickness of the wallboard used. In FIG. 1, the dunnage strips 18 are shown along their side edge. As will be described below, the dunnage strips 18 are placed transversely along the unit 14 in spaced, parallel orientation to facilitate the insertion of the forks of forklift trucks or AGVs (not shown).

Figure 2:
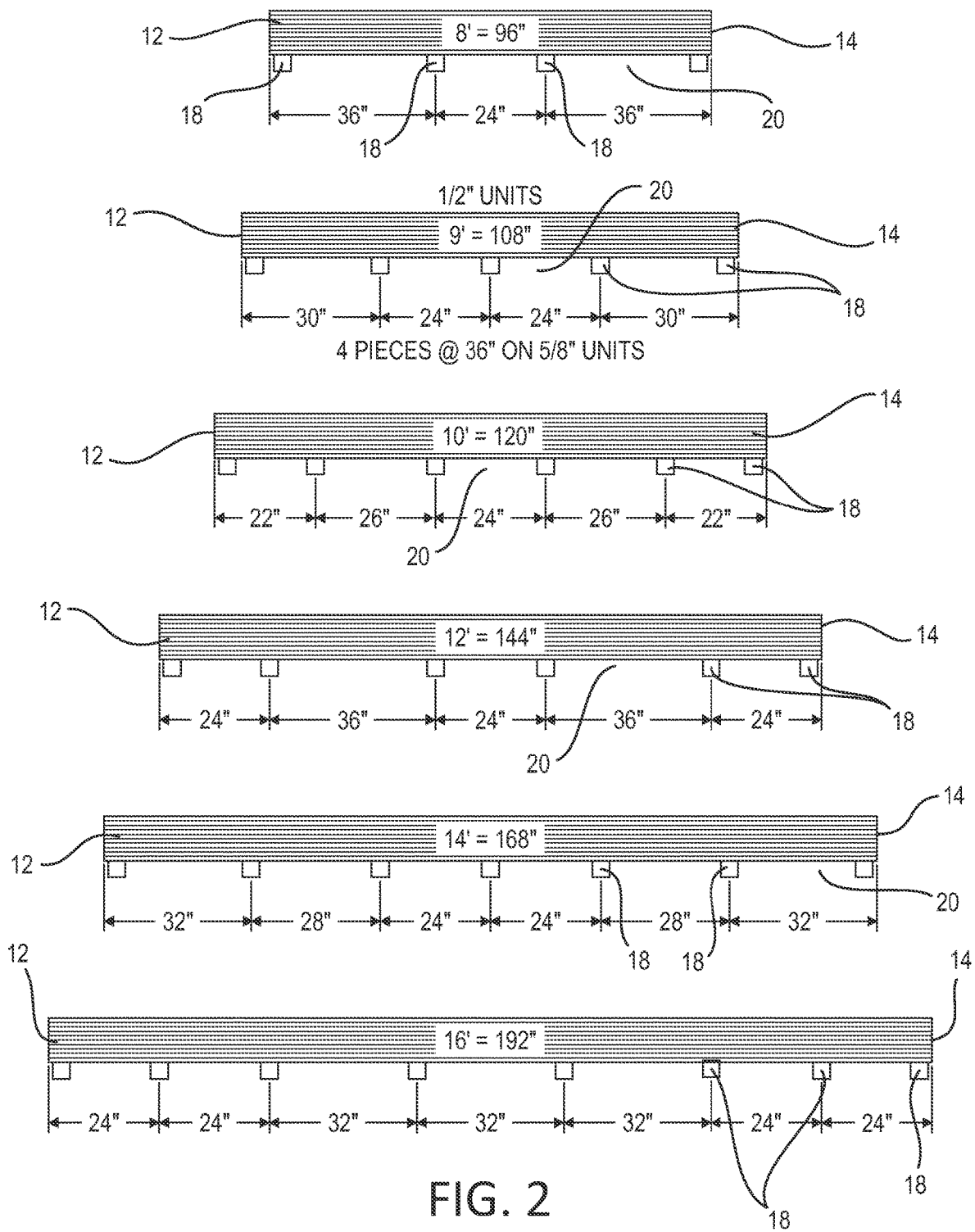
FIG. 2 is a diagram of the placement of dunnage strips as a function of the size of the panels.

Referring now to FIG. 2, an end view of a plurality of different units 14 are shown, to illustrate the arrangement of dunnage strips 18. Since the units 14 vary in weight with the size and/or thickness of the wallboard panel 12, more dunnage strips 18 are needed to support the weight of the unit 14 as thicker and/or larger panels 12 are assembled. Also, additional dunnage strips 18 are needed to prevent sagging of the panels in a particular unit 14, especially as the units are loaded upon each other to form stacks 16. As noted above, depending on the type of panel 12, units 14 vary in weight from 2,000 to 3,800 pounds. Weights for stacks 16 range between 5,000-12,000 pounds. The spacing of the dunnage strips 18 is also arranged to define spaces 20 that accommodate the insertion of forks of forklift trucks or AGV's.

More specifically, the preferred spacing of dunnage strips 18 for 8 foot panels 12 is 36, 24, 26 inches. Next for ½ inch thick panels 12 9 feet in length, the dunnage spacing is 30, 24, 24 and 30 inches. Also the dunnage spacing for 10 foot panels 12 is 22, 26, 24, 26 and 22 inches. As the panels 12 increase to 12 feet, the dunnage strip spacing is 24, 36, 24, 36, and 24 inches. Further, for 14 foot panels 12, the dunnage strip spacing is 32, 28, 24, 24 28 and 32 inches. Lastly, for 16 foot panels 12, the dunnage strip spacing is 24, 24, 32, 32, 32, 24 and 24 inches. In FIG. 2, the spaces 20 between adjacent dunnage strips 18 are shown. As noted above, metric spacing and dimensions are also contemplated. Also, it is contemplated that the spacings may vary to suit the application.

Figure 3:
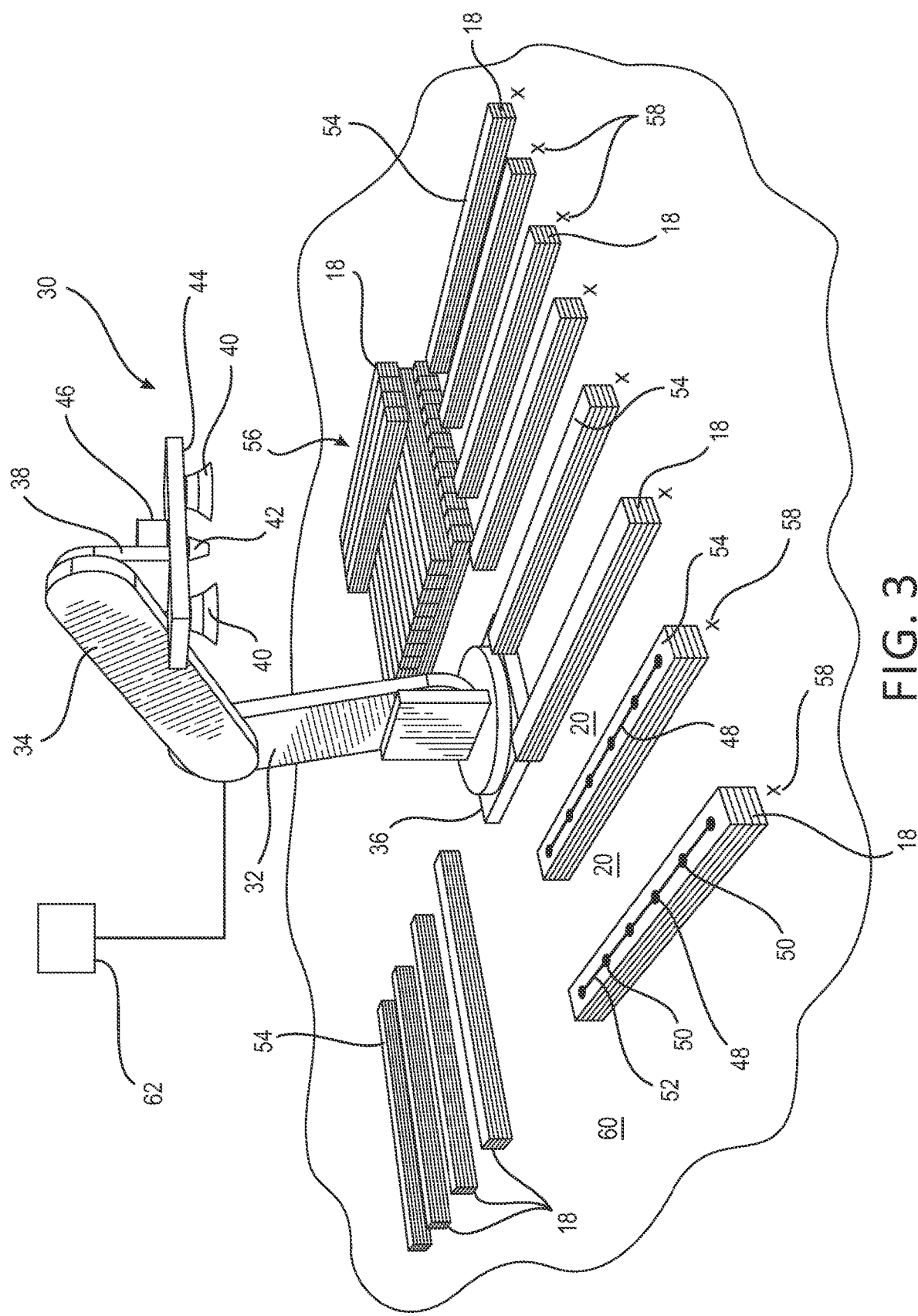
FIG. 3 is a top perspective view of the present system as used in a wallboard production facility.

Referring now to FIG. 3, the present system for robotically placing dunnage strips 18 for receiving wallboard panels 12, is generally designated 30. First, an industrial automated robot 32 is provided (shown schematically), having a pivoting robot arm 34 connected to a rotatable base 36 or turntable. Preferably, the robot 32 is an industrial automation robot of the type produced by FANUC of Rochester Hills, Michigan, as well as available from other companies. However, this system is not limited in function to a robot 32 but can be realized with a gantry style, overhead handling.

A tool 38 is connected to the robot arm 34 for relative pivotal movement as is known in the art, and is equipped with at least one suction cup 40 and a glue dispenser 42. It is contemplated that the specific orientation and/or placement of the suction cups 40 and the glue dispenser 42 may vary to suit the application and/or with the various robot models, but in the present application, the glue dispenser 42 is placed between a pair of the suction cups 40. Also preferred is that both the suction cups 40 and the glue dispenser 42 depend from a lower surface 44 of the tool 38. In embodiments, the tool 38 is optionally configured for handling multiple dunnage strips 18 at a time.

It is preferred that the glue dispenser 42 is connected to a glue applicator 46 providing a source of one of "gummy glue" fugitive glue, e-z release glue, "booger glue" and "credit card glue" 48 as such compositions are known in the art. Such glue is a low-tack adhesive that produces a removable non-permanent joint. In some cases, the glue is provided in hot melt format. This type of glue is desirable because it can be readily removed from the lowermost panel 12 of the unit after shipment to that the panel can be used in a desired construction application without any glue residue. It is contemplated that double-sided tape is also suitable for this application.

As seen in FIG. 3, the glue 48 is applied in at least one of mounds or globs 50 or linear beads 52 onto an upper surface 54 of the dunnage strip 18. It is contemplated that the application of the glue 48 is performed during transfer of the strips 18 from a stack or dunnage cube 56 by the robot arm 34, or after the placement of the strips 18 in preset or programmed, unit-specific locations 58 on the warehouse floor 60.

The robot 32 is provided with a control unit, schematically represented at 62, in which is programmed or preset a plurality of preset dunnage placement locations 58, sets of such placement locations being associated with the various desired positions of dunnage strips 18 as depicted in FIG. 2. The preset placement locations 58 also include the spaces 20 between the dunnage strips for fork access when lifting is needed. These positions are also associated with various sizes and/or thicknesses of wallboard panels, also as indicated in FIG. 2.

As such, when a particular type or size or thickness of wallboard panel 12 is going to be produced and packaged, the operator selects that panel configuration through suitable input on the robot control unit 62. The control unit 62 then instructs the robot 32 to place the dunnage strips 18 in the desired locations 58. The program steps in the control unit 62 include lifting of the dunnage strips 18 from the dunnage cube 56 which is achieved through use of the at least one and preferably two suction cups 40 and movement of the robot arm 34 and rotating motion of the robot 32 about the base 36 as is known in the art.

It will be seen that the preset dunnage locations 58 include dunnage strip spacings of at least one of 22, 24, 26, 28, 30, 32 and 36 inches. More specifically, the preset dunnage strip spacing for 8 foot panels is 36, 24, 26 inches. For ½ inch thick panels 9 feet in length, the preset dunnage spacing is 30, 24, 24 and 30 inch dunnage spacing. Also, the preset dunnage spacing for 10 foot panels is 22, 26, 24, 26 and 22 inches. Preferably, the preset dunnage spacing for 12 foot panels is 24, 36, 24, 36, and 24 inches. For 14 foot panels, the preset dunnage spacing is 32, 28, 24, 24 28 and 32 inches. Lastly, for 16 foot panels, the preset dunnage spacing is 24, 24, 32, 32, 32, 24 and 24 inches. Metric spacing and dimensions are contemplated.

After the first dunnage strip 18 in a particular dunnage strip placement program is located on the warehouse floor 60, operating under the control unit 62, the robot 32 repeats the selection, lifting placement and glue deposition steps described above on each successive dunnage strip until the dunnage strips are appropriately arranged, including the proscribed spacing between such strips. At that point, the warehouse staff or an AGV begins loading bundles 10 of wallboard panels 12 until a unit 14 is assembled or formed. As the bundles 10 are placed upon the dunnage strips 18, the glue 48 is activated by the pressure and/or heat of the loading. The glue 48 then retains the dunnage strips to a bottom surface 64 of the bundle 10. As stated above, once the bundle 10 having the bottom surface 64 secured to the dunnage strips is going to be selected for construction use, the glue 48 is easily removable by the installer.

Optionally, the present system 30 is configured so that the robot tool 38 picks up multiple dunnage strips 18 at a time, then sequentially deposits them. While the present system 30 is designed for use with dunnage strips 18, it is contemplated that alternate spacing structures are equally suitable to support multiple wallboard panels 12 above the warehouse floor 60 for access by forklifts or AGV's. The floor level stack of wall board with attached dunnage provides the dunnage that is normally needed onto the shipping carrier's vehicle.

While a particular embodiment of the present robotic wallboard dunnage placement system has been described herein, it will be appreciated by those skilled in the art that changes and modifications may be made thereto without departing from the invention in its broader aspects and as set forth in the following claims.

The invention claimed is:

1. A system for robotically placing dunnage strips for receiving wallboard panels, comprising:
   providing a robot with a robot arm with a tool having at least one suction cup and a glue dispenser;
   presetting in said robot a plurality of dunnage location programs, each associated with a particular wallboard panel size or thickness;
   providing a dunnage cube having a plurality of stacked individual dunnage strips, each said strip having an upper surface;
   upon the selection of a preset wallboard panel dunnage placement, said robot arm using said at least one suction cup to select and lift a dunnage strip from said dunnage cube;
   said robot arm placing at least one said dunnage strip upon the warehouse floor in a predesignated location per said preset location program;
   said glue dispenser depositing a supply of glue upon said upper surface of said dunnage strip;
   said robot repeating said dunnage strip selection, lifting, placement and deposition of glue to multiple dunnage strips until said preset arrangement is completed per said program.

2. The system of claim 1, further including placing at least one wallboard panel upon said upper surfaces of said dunnage strips so that a lowermost panel of said at least one panel is adhered to said strips.

3. The system of claim 2, further including placing multiple wallboard panels upon said at least one panel adhered to said strips so that a unit of wallboard panels is formed.

4. The system of claim 1, wherein said glue is one of gummy glue fugitive glue, e-z release glue, booger glue and credit card glue.

5. The system of claim 1, wherein said robot arm tool has a pair of said suction cups with a glue dispenser mounted therebetween.

6. The system of claim 1, wherein the predesignated locations include dunnage strip spacings of at least one of 22, 24, 26, 28, 30, 32 and 36 inches.

7. The system of claim 1, wherein a preset spacing for 8 foot panels is 36, 24, 26 inches.

8. The system of claim 1, wherein for ½ inch thick panels 9 feet in length, a preset dunnage spacing is 30, 24, 24 and 30 inches.

9. The system of claim 1, wherein a preset dunnage spacing for 10 foot panels is 22, 26, 24, 26 and 22 inches.

10. The system of claim 1, wherein for 12 foot panels, a preset dunnage spacing is 24, 36, 24, 36, and 24 inches.

11. The system of claim 1, wherein for 14 foot panels, a preset dunnage spacing is 32, 28, 24, 24 28 and 32 inches.

12. The system of claim 1, wherein for 16 foot panels, a preset dunnage spacing is 24, 24, 32, 32, 32, 24 and 24 inches.

13. The system of claim 2, where the dunnage is attached to the wallboard panels merely by lowering said panels upon the dunnage.

14. The system of claim 1 wherein the implementation of automated guided vehicle (AGV's), and said robotically positioned dunnage with dispensed glue at a bottom of a panel stack, results in an open warehouse floor, without the need of floor permanent dunnage, and maintains flexible warehouse usage and maintenance.

\* \* \* \* \*